US011965362B2

(12) United States Patent
Buss

(10) Patent No.: US 11,965,362 B2
(45) Date of Patent: Apr. 23, 2024

(54) LOCKING DOOR HANDLE FOR SINGLE-USER WASHROOM AND LATCH THEREFOR

(71) Applicant: BUSS INNOVATIONS LTD., Delta (CA)

(72) Inventor: Jonathan Edward Buss, Delta (CA)

(73) Assignee: BUSS INNOVATIONS LTD., West Vancouver (CA)

( * ) Notice: Subject to any disclaimer, the term of this patent is extended or adjusted under 35 U.S.C. 154(b) by 222 days.

(21) Appl. No.: 17/338,615

(22) Filed: Jun. 3, 2021

(65) Prior Publication Data

US 2022/0018160 A1 Jan. 20, 2022

Related U.S. Application Data

(60) Provisional application No. 63/053,848, filed on Jul. 20, 2020.

(51) Int. Cl.

*E05B 57/00* (2006.01)
*E05B 1/00* (2006.01)
*E05B 41/00* (2006.01)

(52) U.S. Cl.

CPC .............. *E05B 57/00* (2013.01); *E05B 1/003* (2013.01); *E05B 41/00* (2013.01)

(58) Field of Classification Search

CPC ................... E05B 1/003; E05B 1/0038; E05B 2001/0076; E05B 7/00; E05B 13/105;

(Continued)

(56) References Cited

U.S. PATENT DOCUMENTS 1,944,469 A * 1/1934 Schlage .................. E05B 41/00 70/438
4,262,507 A * 4/1981 Flack ...................... E05B 41/00 70/432

(Continued)

FOREIGN PATENT DOCUMENTS

EP 3336284 A1 * 6/2018 ......... E05B 15/0053
EP 3904627 A1 * 11/2021

(Continued)

*Primary Examiner* — Kristina R Fulton
*Assistant Examiner* — Noah Horowitz
(74) *Attorney, Agent, or Firm* — Palmer IP Inc

(57) ABSTRACT

Aspects relate to a door device configured to open, close, lock, and unlock a door in a hands-free nature, designed to allow a user to enter and leave a single-user restroom without needing to touch the door handle and/or lock with their hand. The door device includes a latch which interfaces with a strike plate, the latch shaped with two angled surfaces which allow a door to be opened and closed. The door device also includes an interior handle extending outward from an interior side of the door, the interior handle able to lock the door by abutting the latch to fix the latch in place, the interior handle designed to lock the door with a linear directional movement and to unlock the door with an opposite linear directional movement. The door device further includes a back cover extending outwardly from an exterior side of the door, the back cover including a status indicator which provides an indication of whether the door is in a locked state.

21 Claims, 11 Drawing Sheets

(58) Field of Classification Search
CPC ...... E05B 55/00; E05B 65/0035; E05B 65/10; E05B 65/102; E05B 65/1046; E05B 65/1053; E05B 65/106; E05B 65/1066; E05B 65/1073; E05B 39/00; E05B 41/00; E05B 57/00; E05B 65/06; E05B 65/02; E05C 1/06; E05C 1/12
See application file for complete search history.

(56) References Cited

U.S. PATENT DOCUMENTS

| | | | | |
|---|---|---|---|---|
| 4,629,228 | A * | 12/1986 | Marko | E05C 1/14 292/169.18 |
| 5,403,047 | A * | 4/1995 | Walls | E05C 1/14 292/336.3 |
| 6,009,932 | A * | 1/2000 | Smith | E05C 1/14 160/180 |
| 6,293,598 | B1 * | 9/2001 | Rusiana | E05C 1/14 70/91 |
| 6,516,643 | B1 * | 2/2003 | Olshausen | E05B 41/00 70/432 |
| 6,527,310 | B1 | 3/2003 | Bellamy | |
| 8,419,081 | B2 * | 4/2013 | Zhang | E05B 65/00 292/DIG. 20 |
| 8,424,928 | B2 * | 4/2013 | Lin | E05B 53/00 70/92 |
| 8,720,116 | B1 * | 5/2014 | Ahmad | E05B 1/0053 16/431 |
| 9,551,173 | B2 * | 1/2017 | Helisten | E05B 55/00 |
| 9,765,549 | B2 * | 9/2017 | Shah | E05B 1/0053 |
| 11,193,311 | B2 * | 12/2021 | Grewe | E05B 65/1006 |
| 11,408,206 | B2 * | 8/2022 | Lunday | E05B 13/101 |
| 11,725,415 | B2 * | 8/2023 | Chen | E05C 1/12 292/172 |
| 2002/0104339 | A1 * | 8/2002 | Saner | E05C 9/026 70/108 |
| 2006/0119112 | A1 * | 6/2006 | Lin | E05B 7/00 292/336.3 |
| 2013/0026770 | A1 * | 1/2013 | Balbo Di Vinadio | E05B 63/04 292/174 |
| 2020/0332554 | A1 * | 10/2020 | Kulicki | B60R 7/04 |
| 2021/0214972 | A1 * | 7/2021 | Szczerkowski | E05B 1/0053 |
| 2022/0010588 | A1 * | 1/2022 | Koenig | E05B 65/0035 |

FOREIGN PATENT DOCUMENTS

| | | | | |
|---|---|---|---|---|
| KR | 200352118 | Y1 | * | 6/2014 |
| KR | 20170043072 | A | * | 4/2017 |

* cited by examiner

LOCKING DOOR HANDLE FOR SINGLE-USER WASHROOM AND LATCH THEREFOR

FIELD

The present disclosure relates to a locking door handle which allows for hands-free operation of a door, such as a single-user washroom. In particular, the disclosure relates to a device or apparatus which can open, lock, and unlock a door using a push interface and which also includes a three-dimensional status indicator which indicates to users on either side of the door whether the door is locked or unlocked.

BACKGROUND

Many individuals may prefer to avoid touching sanitary doors, such as the doors on a single-user public washroom. These washroom doors may be unclean, but most of these doors require that a washroom user use their hands to push or pull the door open and to lock or unlock the door. For example, many washroom doors use a latch mechanism to lock the door. This mechanism typically slides horizontally to lock and unlock the washroom door. To use these door locks, users may have to touch the mechanism to both lock and unlock the washroom door. Further, users may also need to grab a handle to pull open the washroom door itself from the pull side. As such, sanitary door devices which allow a user to open, close, lock, and unlock a door without the use of their hands may be desired.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a locking door handle for a single-user washroom. The door device includes a latch which interfaces with a strike plate, the latch shaped with two angled surfaces which allow a door to be opened and closed. The door device also includes an interior handle extending outward from an interior side of the door, the interior handle able to lock the door by abutting the latch to fix the latch in place, the interior handle designed to lock the door with a linear directional movement and to unlock the door with an opposite linear directional movement. The door device further includes a back cover extending outwardly from an exterior side of the door, the back cover including a status indicator which provides an indication of whether the door is in a locked state.

DETAILED DESCRIPTION

Figure 1A:
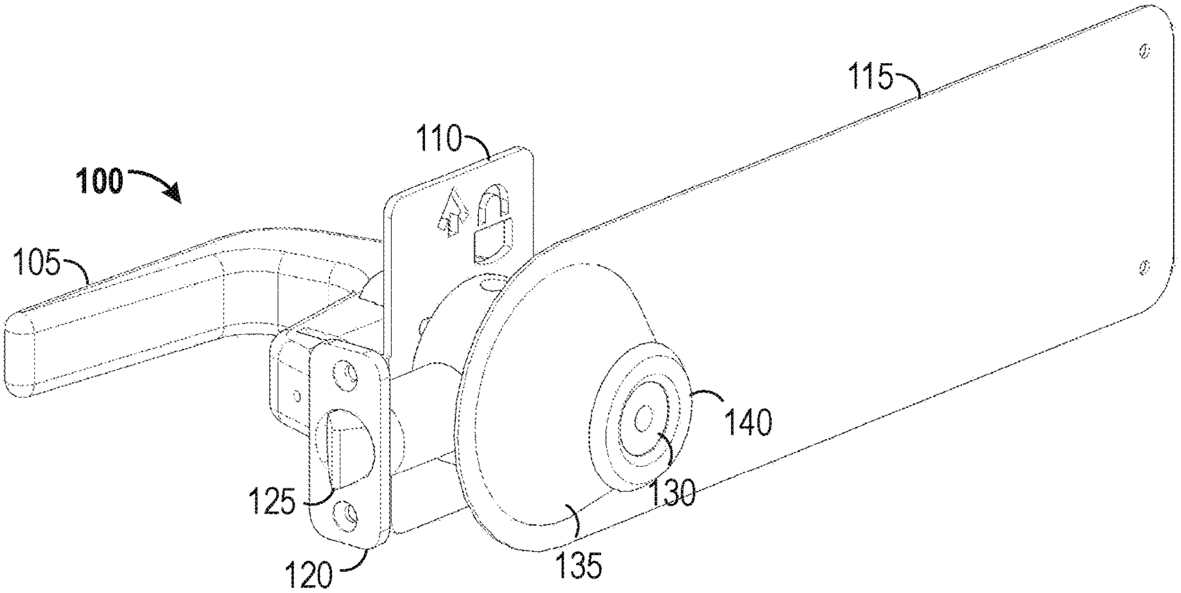
FIG. 1A illustrates a view of an exemplary door handle and locking mechanism according to one aspect of the present application.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented, or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein can be embodied by one or more elements of a claim.

Although aspects are described herein, many variations and permutations of these aspects fall within the scope of the disclosure. Although some benefits and advantages of the preferred aspects are mentioned, the scope of the disclosure is not intended to be limited to benefits, uses, or objectives. The detailed description and drawings are merely illustrative of the disclosure rather than limiting. In the following description, specific details are given to provide a thorough understanding of the examples. However, the examples may be practiced without these specific details.

Many individuals prefer to avoid touching certain public surfaces to limit their exposure to dirty surfaces or to surfaces which may be contaminated with bacteria, viruses, or other unwanted contaminants. For example, many individuals may prefer to avoid touching common public surfaces such as door handles as these surfaces are touched by many individuals and could potentially be contaminated with bacteria or viruses which could make an individual sick. These issues may be especially prominent in public washrooms due to the increased likelihood that other users of the washrooms have unclean hands. Accordingly, some users may prefer ways to interact with common public washroom appliances with a minimal amount of contact between their hands and those appliances.

The door handles and locking mechanisms on single-user washrooms may be an especially acute source of exposure for germs. A handle and lock on a single-user washroom door typically require that a user touch them multiple times: To turn the handle and push open the door, to close and lock the door, and to unlock and open the door. For example, users are often expected to twist a small handle in order to push the door open, to push a small button or use a small latch to lock the door, and to open the door by grabbing a small handle, turning the handle and pulling the door open. Each of these steps typically requires a user to directly touch the door handle. Given modern preference regarding germs and given modern concerns about sickness and the potential spread of disease, some users may prefer door handle and locking mechanisms which do not require the use of a hand to operate. These mechanisms may also offer advantages for users who have relatively poor motor skills or who suffer from other physical and mental disabilities which make it difficult to operate conventional door handles and locks.

Many of the aspects of the present disclosure may also be applied to door handles in other settings. For example, the door handles described herein are often described as being for a single-use public washroom, with the handle on one side and a push plate on the other side of the door. However, the door handles described herein may provide a convenient user interface for other types of doors as well. For example, the door handles described herein may be used both for private doors, such as on a single-user bathroom, but also for passage doors, such as other interior doors.

Figure 1B:
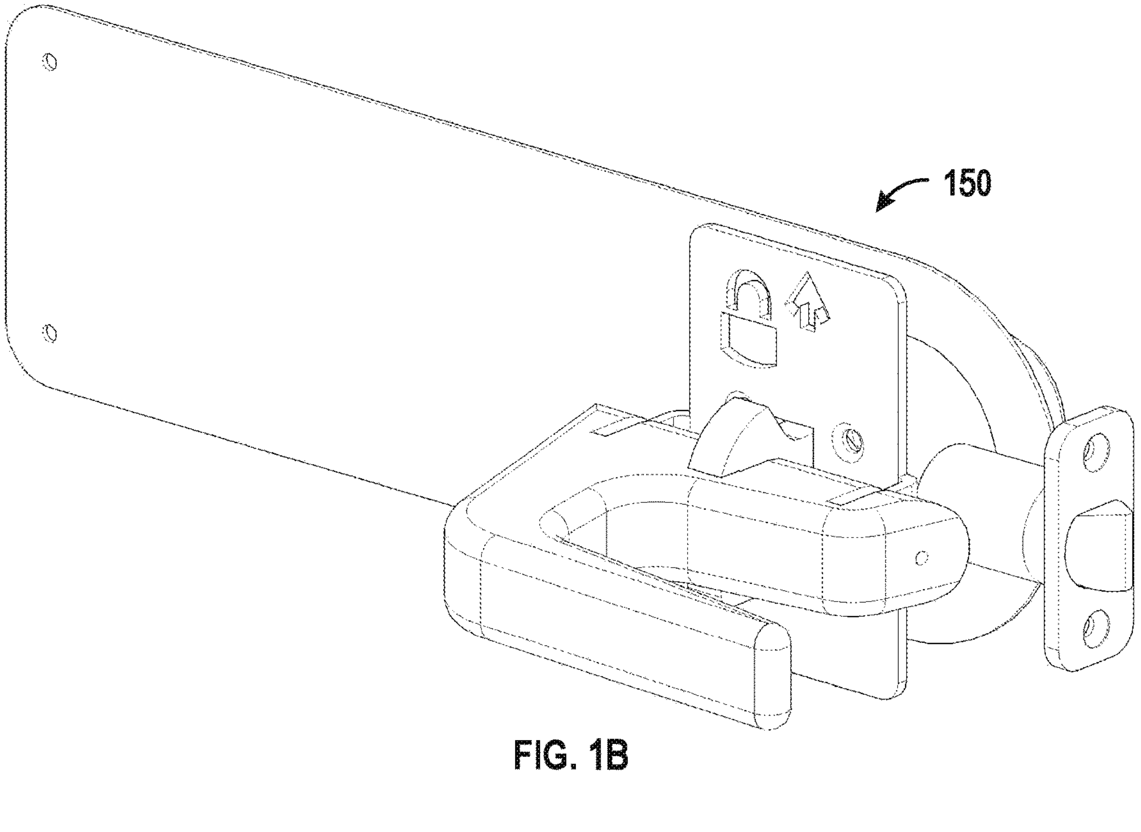
FIG. 1B illustrates another view of an exemplary door handle and locking mechanism according to one aspect of the present application.

FIG. 1A illustrates a view of an exemplary door handle and lock 100 according to one aspect of the present application. FIG. 1B illustrates another view of an exemplary door handle and lock 150 according to one aspect of the present application. This door handle and lock 100 may be configured to allow a user to open, close, lock, and unlock the door without the use of their hands. The door handle and lock 100 includes an interior handle 105 which may be used on a "pull" side of the door if, for example, the door allows pushing from one side and pulling from another. For example, if the door handle and lock 100 is used on a single-user public washroom stall, the interior handle 105 may be directed towards the interior portion of the washroom stall. The interior handle 105 may take any number of shapes, and the illustrated shape is merely exemplary. It may be useful to choose a handle shape which allows a user to pull open the door without using their hand. For example, a shape may be chosen which allows a user to pull the door open with their foot, their knee, their hip, their elbow, their forearm, or with another part of their body or another object. Local regulations and code may dictate some of the design choices in choosing a design. For example, some location may require that the handle 105 extends a maximum of four inches from the door itself. For example, the handle or a latch of the handle may extend three inches from the door, may extended 3.5 inches from the door, or may extend between three and four inches from the door. In some respects, it may be beneficial for the handle 105 to be relatively large to allow users to easily manipulate the handle 105 with parts of their body other than their hand, as smaller handle sizes may require more dexterity and grip strength, perhaps necessitating the use of a user's hand to grab a small handle.

As is indicated on the exemplary interior plate 110, the interior handle 105 may be configured to lock a door by moving the interior handle 105. Here, interior plate 110 contains symbols with both a lock and an upwards arrow, which suggest to a user how to use the handle 105. The interior handle 105 may be configured to lock the door using a linear directional movement from a user, such as an upward movement, a downward movement, or movement to the left or right or in other directions. For example, the interior handle 105 may be configured to rotate upward, rotating around a line planar with the door and parallel to the ground. In this exemplary illustration, the door handle and lock 100 may be installed on a door such that the interior handle 105 can be moved upwards. The door handle and lock 100 may be configured to lock the door when the interior handle 105 is moved to a position upward of where it is illustrated. The interior handle 105 may be configured to make a tactile and/or auditory click when the lock is engaged to assure a user that the door is locked. Conversely, the door handle and lock 100 may be configured to unlock the door when the interior handle 105 is moved back downward to its original horizontal position, as illustrated. This downward movement may also have a tactile response, such as clicking, to inform a user that the door is not locked. This upward and downward movement may allow a user to lock and to unlock the door easily using a part of their body other than their hand, such as locking and unlocking the door with their arm, leg, foot, knee, or another part of their body. The interior handle 105 may also have a required force to lock and unlock the door. The force needed to lock and unlock the door may be selected to allow for ease of locking and unlocking the door without the use of a user's hands.

In some respects, it may be easier for users to lock and unlock the door without their hands based on this movement of the interior handle 105 than it would be to lock or unlock a door which required the user to, e.g., push a small button the end of a handle, to twist a small knob on the end of a handle, or to slide a small latch into and out of a locking mechanism. As illustrated, the interior handle 105 locks and unlocks a door by moving it vertically, rotating about a line which is on the plane of the door and parallel to the ground. Other directions of rotation may also be used for locking and unlocking the door. For example, the interior handle 105 may be configured to rotate around a line perpendicular to the floor and parallel with the door, moving to the left or to the right in order to lock and unlock the door rather than moving up and down. Alternatively, the interior handle 105 may be configured to rotate around other directions or lines in addition, such as diagonal lines or lines which do not run along the plane of the door itself. In general, the direction of rotation of the interior handle 105 may be selected in order to allow for hand-free use of the interior handle 105 while also offering configuration options for various use cases of the door handle and lock 100, such as for uses in cramped spaces.

Figure 5:
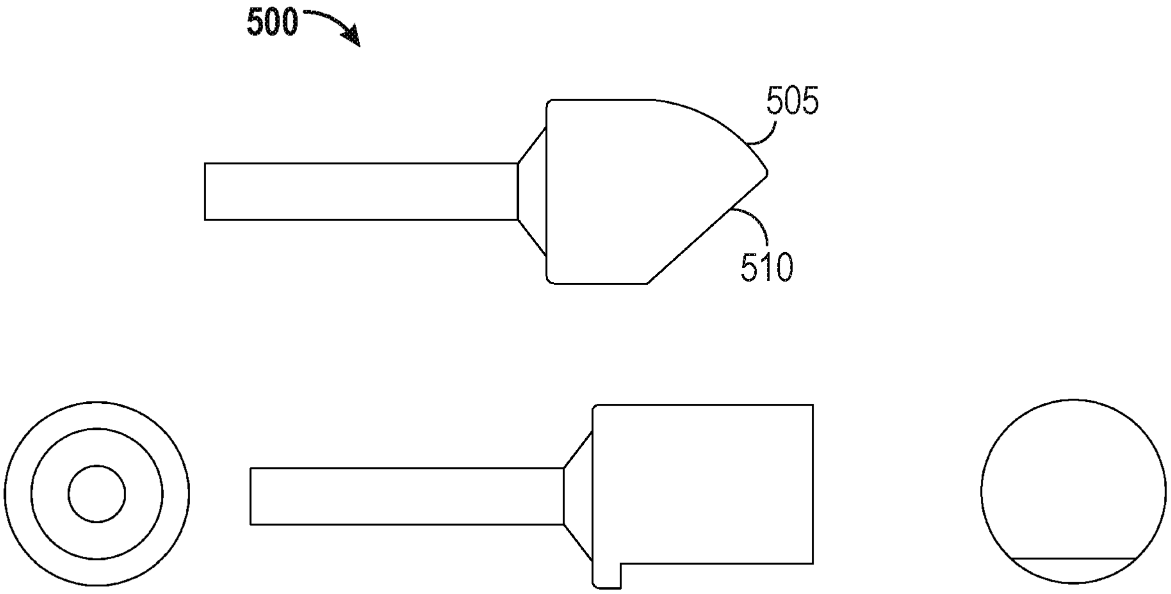
FIG. 5 illustrates an exemplary latch according to one aspect of the present application.

The door handle and lock 100 may also include a faceplate 120 which is configured to removably attach to the side of the door. For example, this faceplate 120 may be screwed onto the door using screw holes which are counter-sunk so that the screws and the faceplate 120 are flush with the side of the door. A latch 125 may be placed through the faceplate 120. The latch 125 may be configured to interface with a compatible strike plate which is installed on the door frame and which contain a hole for the latch 125 to extend through when the door is closed. The latch 125 may be on a spring or other mechanism which allows it to remain extended except when force is applied to it, such as by a strike plate installed on the door frame. The latch 125 may be shaped such that the door will close when force is applied to it. For example, the edge of the latch 125 may be placed at an angle where the strike plate can apply force to the latch 125 to depress the latch 125 and allow the door to close. Similarly, the latch 125 may be shaped to allow the door to open when force is applied to push the door open without requiring that a user turn a knob or handle. That is, the latch 125 may be sloped on both its front and back sides to allow the door to be pushed open and pulled closed without turning a knob or handle, as depicted in FIG. 5. For example, the latch 125 may include two differently sloped surfaces, one of which allows a door to be pushed open and another which allows the door to be pushed closed. These two sloped surfaces may have different angles and different curvatures, such as having a first surface which is sloped at a particular angle but is straight, and another surface which is partly curved. For example, one of the sloped surfaces may be configured to temporarily retract the latch when the door is pushed closed, thereby interacting with an exterior portion of a strike plate which may itself be angled and concave. The other sloped surface may be configured to interact with an interior portion of the strike plate, which may not be angled or may be angled to a different degree than the exterior of the strike plate. Because the two sloped surfaces interact with different portions of the strike plate, it may be preferable to shape each sloped surface differently to respond appropriately. Similarly, one of the sloped surfaces may also be used to keep the door locked when the latch is in a locked position. For example, the latch 125 may be on a spring to temporarily retract when a force is applied to it, allowing the door to open and close when it is unlocked. However, when the door is locked, the latch 125 may be fixed in place, or prevented from retracting, which may in turn prevent the door from opening. As a result, this sloped surface should be shaped appropriately to keep the door closed when the latch 125 is fixed in place, which may lead to certain shapes being more beneficial.

The two sloped surfaces on the latch 125 do not each need to be the same size, and the central line between the two sloped surfaces may not be in the center of the latch itself. For example, one of the two sloped surfaces may be larger than the other, such that the latch is not symmetrical and such that a line between the two surfaces is not in the center of the latch, but rather is offset to one of the sides. This unique geometry may be configured to allow the latch 125 to close the door by depressing the latch 125 against a sloped strike plate, but also allow the latch 125 to retract when the door is pushed open, with the latch interfacing with a differently shaped interior geometry of the strike plate. The strike plate itself may be made using durable materials but coated or covered by materials which allow for quiet, lower-friction operation. For example, the strike plate may have ultra-high molecular weight polyethylene (UHMW) covering the portion of the plate which interfaces with the latch, allowing for durability and low-friction operation. In some aspects, the latch 125 may be configured to retract when pressure is applied to it while the door is unlocked but may be configured to remain extended and to keep the door closed when it is locked.

The door handle and lock 100 may also include a push plate 115. Push plate 115 may be positioned on the exterior of a single-user washroom door. These doors may open inwardly into a washroom stall, allowing a user to enter the washroom stall and to close the door behind themselves. The push plate 115 may be any shape and/or alignment. For example, the push plate 115 is illustrated in a brushed metallic finish and oriented horizontally. This orientation may encourage a user to engage the push plate 115 with a body part other than their hand. For example, the push plate 115 may be used to push open the door with a user's hip or arm. Placing a push plate 115 onto the washroom door may be helpful for users to inform them that the door is a "push" door rather than a "pull" door. Other materials and orientations of the push plate 115 may also be used if a push plate 115 is used on the door at all. The push plate 115 may be detached from the back cover 135, such as being placed above the back cover, below the back cover, or in other orientations as may be desired by one skilled in the art.

The door handle and lock 100 may include the back cover 135 which may contain a barrel 130. The back cover 135, as illustrated, is generally shaped in a truncated cone, similar to the exterior of many dead bolt locks. This shape may suggest to users that the door has a lock and that this is the lock, which may help users identify the lock the first time they interact with this innovative door handle and lock 100. The back cover 135 may be shaped to allow a user to pull the door closed, if a user desired. For example, the back cover 135 may be shaped with a lip 140 which a user could use to close the door after themselves when they leave the washroom stall, if desired for whatever reason. The back cover 135 may also be shaped in manners other than this dead bolt lock-like shape, such as being spherical, square, a polyhedron, or another shape.

The back cover 135 may also contain the barrel 130. The barrel 130 may be cylindrical in shape, as illustrated. Other shapes may also be used as appropriate. The barrel 130 may be configured to provide an indication of whether the door handle and lock 100 is locked or unlocked. For example, the barrel 130 may be configured to extend outwardly from the back cover 135 when the door handle and lock 100 is locked. In one aspect, the sides of the barrel 130 may be a different color than the rest of the barrel 130, such as red or another color suggesting that the washroom stall or other installation location is in use. These sides may be covered by the back cover 135 when the door is unlocked but may extend out past the back cover 135 when the door is locked, thereby allowing users to see whether the door is locked without having to push on the door to check.

In one aspect, the barrel 130 may also have a security feature or safety feature which allows an owner of the door handle and lock 100 to open the door in an emergency or other scenario. For example, the barrel 130 may contain a hole in the center which allows an object to be pushed into the hole and to their push or pull on the barrel 130 to open the door. This mechanism may be configured to allow the door to be opened for security reasons when it is locked and may even be configured to allow the door to be opened when someone "barricades" themselves in the washroom and hold the door locked. For example, the barrel 130 may have a central hole which is threaded, perhaps after some depth. This threaded central hole may allow a threaded emergency screw or other implement to be inserted into the hole, threaded through the threads, and to be used to pull the barrel 130 to unlock the door. In one aspect, the barrel 130 may be pulled to unlock the door when a user inside is holding the door locked by pulling on the barrel 130 while simultaneously pushing the door open. This security feature may be useful in health emergencies or if, for example, a child attempts to barricade themselves in the washroom.

Figure 2:
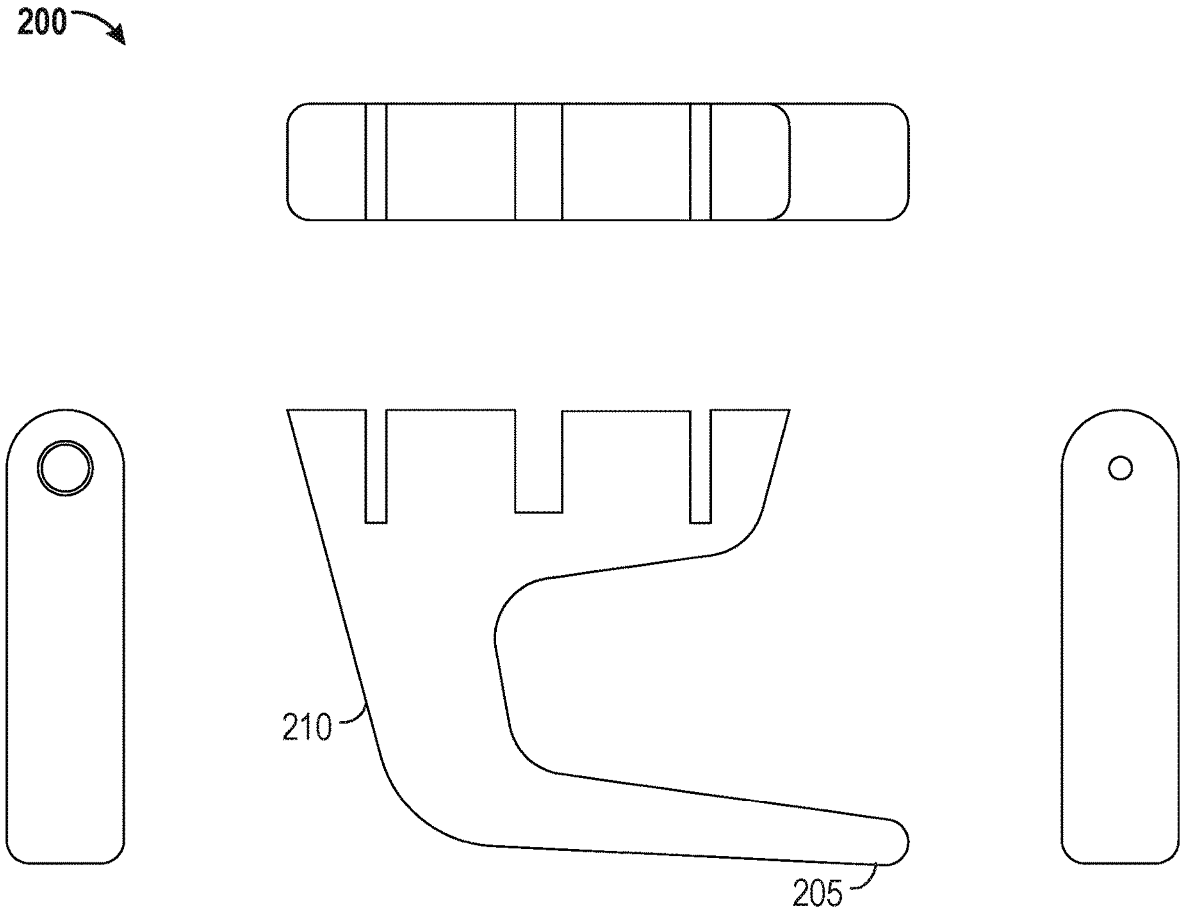
FIG. 2 illustrates an exemplary door handle according to one aspect of the present application.

FIG. 2 illustrates an exemplary door handle 200 according to one aspect of the present application. The door handle 200 is illustrated from all four angles for clarity. The shape and size of this door handle 200 are merely exemplary. The door handle 200 may have a shape configured to allow a user to control the handle without the use of their hand. Here, the door handle 200 has been illustrated with a lever 205 which protrudes from an outward projection 210 from the door to form a handle. The door handle 200 may protrude out from the door far enough to allow a user to control the handle with their arm or their foot or another body part. For example, the door handle 200 may protrude approximately four inches from the door itself, to allow easy control of the door handle 200 using a part of the body other than the hand. The size of the door handle 200 may be altered based on considerations including local building codes, the size and dimensions of the washroom stall, and other localized size requirements and/or design considerations. For example, the door handle 200 may be placed horizontally to the ground, and with the end of the lever 205 facing the near edge of the door. In some jurisdictions, there may be fire codes which limit the placement of door handles to prevent objects, e.g., a purse or backpack strap, from becoming stuck on the door handle when exiting during a fire. Accordingly, it may be beneficial for the opening of the door handle 200 to be placed facing the edge of the door towards the strike plate to prevent items from becoming stuck in the handle when a user exits a single-user washroom. Placing the door handle 200 to face the near edge of the door may also allow a user to operate the door handle more easily 200 using a body part, such as by using a forearm or wrist rather than their hand.

The shape of the door handle 200 may be selected not only to allow hands-free use to pull the handle, but also to allow the handle to be locked and unlocked hands-free as well. In one aspect, the door handle 200 may locked by being pushed upwards and may unlock with the opposite motion. Thus, the door handle 200 may be shaped to allow easy locking and unlocking with a user's forearm, arm, wrist, hip, knee, or other body part. As illustrated, the door handle 200 may be configured to be attached to an interior pull plate via a hinge mechanism such as using a pin, which allows the handle to rotate upward and downward. The door handle 200 may be made from a durable material such as various types of hard plastic or metal. For example, the door handle 200 may be constructed using polyoxymethylene or a similar material.

In some aspects, this hinging mechanism may be used to retract a latch rather than to lock the door, in a manner akin to turning a conventional doorknob to retract a latch. For example, if a latch is configured to not allow a door to be pulled or pushed open, such as by having a flat surface stopping the latch from being pulled open, the door handle 200 may be configured to retract the latch by pushing upwards or downwards on the handle. This may allow a user to open and close a door either with the handle or by using another body part to avoid directly touching the door and potentially spreading germs. This may be beneficial in public settings where users may prefer to avoid touching public surfaces when possible. This door handle design may also be used with door handles on both sides of the door rather than only on a single side of the door as described. This may allow individuals on both sides of the door to take advantage of its user interface to open and close doors without directly touching those doors with their hand. Alternatively, the hinging mechanism may be used to retract and extend a dead bolt rather than to lock and unlock the latch itself.

Figure 3:
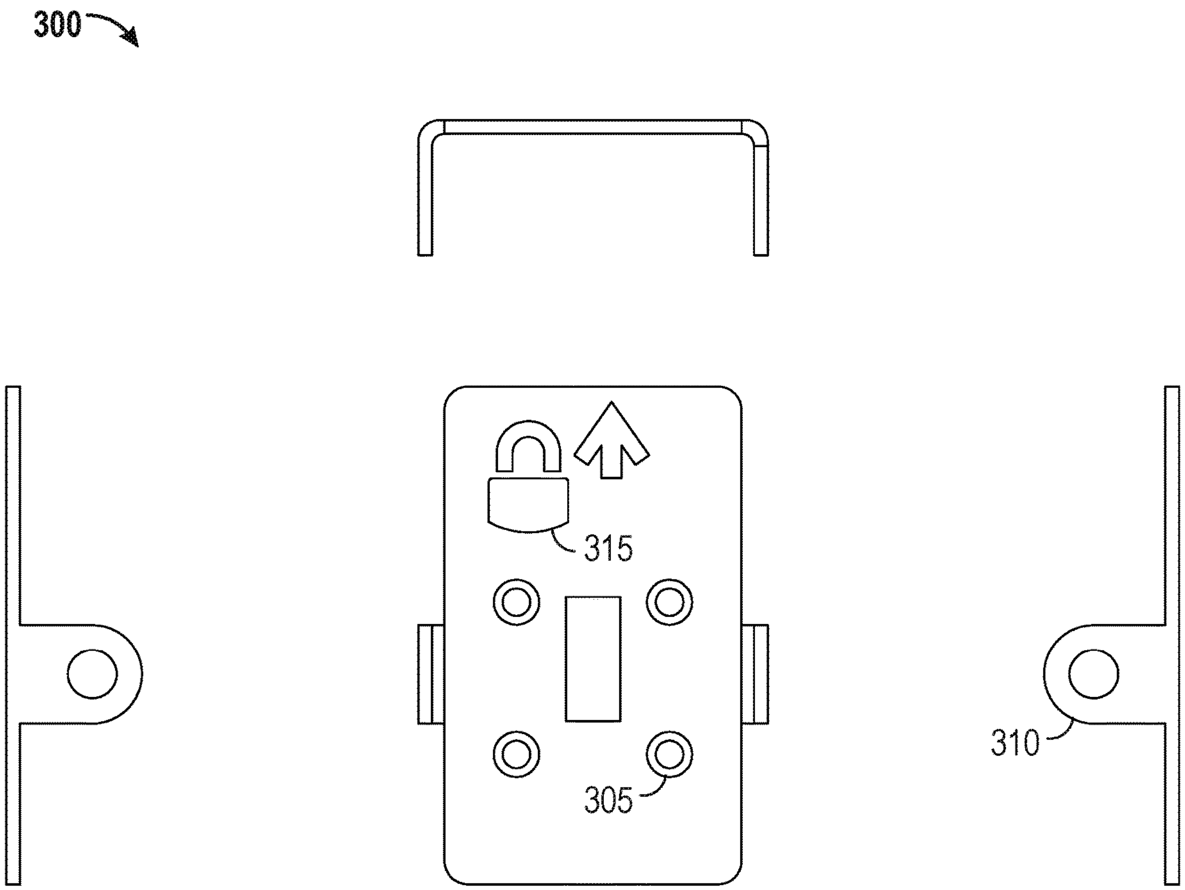
FIG. 3 illustrates an exemplary interior pull plate according to one aspect of the present application.

FIG. 3 illustrates an exemplary interior pull plate 300 according to one aspect of the present application. The interior pull plate may be configured to attach to a door via screws, such as through the illustrated countersunk screw holes 305. The interior pull plate 300 may further include features 310 which allow the door handle to be attached to the plate and allow the door handle to be rotated or moved relative to the plate, which itself may remain stationary and firmly attached to the door. As illustrated, the interior pull plate 300 may also include symbols or instructions 315 informing a user how to use this door handle and lock mechanism. Such instructions may be necessary since this door handle and lock may operate in a manner that is otherwise unfamiliar to new users. The interior pull plate 300 may be constructed from durable materials such as metal or hard plastic with an eye towards cost and longevity. For example, the interior pull plate 300 may be constructed using stainless steel or a similar material.

Figure 4:
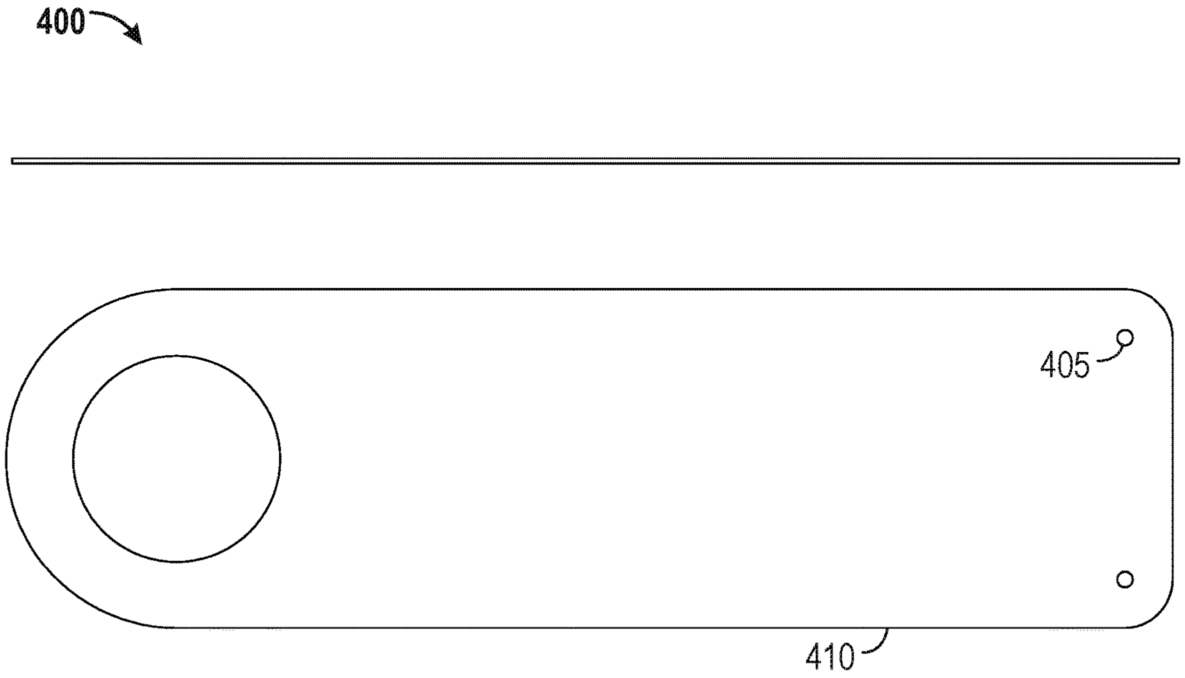
FIG. 4 illustrates an exemplary exterior push plate according to one aspect of the present application.

FIG. 4 illustrates an exemplary exterior push plate 400 according to one aspect of the present application. The exterior push plate 400 may be configured to attach to a door via screws and/or being held on by a back cover. Here, this exemplary exterior push plate 400 has screw holes 405 on one side and the other side is held on by the back cover. The exterior push plate 400 may be intended to suggest to users that the door is a push door. The size, orientation, and shape of the exterior push plate 400 may be designed to suggest to users that the door can be pushed open other than by using a hand. For example, the exterior push plate 400 may include a large horizontal design 410 which may suggest to users that they can open the door with their forearm, hip, foot, or another body part to avoid having to touch a potentially dirty washroom surface. The exterior push plate 400 may be constructed from durable materials such as metal or hard plastic with an eye towards cost and longevity. For example, the exterior push plate 400 may be constructed using stainless steel or a similar material.

FIG. 5 illustrates an exemplary latch 500 according to one aspect of the present application. The latch 500 may be configured to removably engage with a hole in a corresponding strike plate or door frame. The latch 500 may be configured to emerge from a hole in a face plate which is screwed or otherwise affixed to the side of the door. The latch 500 may be kept extended using moderate force, such as with a spring, that allows the latch 500 to be temporarily retracted with force but to otherwise remain extended and allow the door to remain closed even when unlocked. The latch 500 may be configured to allow a door to be both opened and closed without having to turn a handle or otherwise manually retract the latch. The latch 500 may be angled on a first surface 505 and a second surface 510, to open and close the door, which allow the latch 500 to be temporarily retracted due to contact with a lip of a strike plate or another surface. For example, the door may be able to be pushed open, pulled open, and pushed or pulled closed without turning a handle. As illustrated, the first surface 505 may be sloped and may be curved, such as with a convex curve. The first surface 505 may be curved to interface with a strike plate when a door containing the latch 500 is pushed closed. The strike plate itself may include a convex curve which interacts with the first surface 505 to provide force, causing the latch to retract when the door is closed. The geometry of the first surface 505 may be designed to interact with the strike plate in an efficient manner. In other embodiments, the first surface 505 may be sloped at a different angle and use different geometry, such as being flat rather than convex or concave. The second surface 510, as illustrated, may be sloped at a different angle than the first surface 505. The second surface 510 may be flat, rather than convex or concave, and may be configured to interface with an interior portion of the strike plate when the door is pushed open. The second surface 510 may be configured to interface with an interior portion of the strike plate which may not be angled and may not be convex or concave, and so the geometry of the second surface 510 may be selected to operate well with a given strike plate. As illustrated, the first surface 505 and the second surface 510 need not each be identical. Instead, they can use different angles, different concavity, and can use different amounts of space on the face of the latch 500. For example, as illustrated, the first surface 505 may be shorter than the second surface 510, such that a dividing line between the two surfaces does not run down the center of the latch 500, but rather, one of the two surfaces takes up more than half of the latch 500 and the latch 500 itself is asymmetrical.

In one aspect, the door handle and lock may not have a handle to turn to retract the latch 500 at all, as turning a handle may tend to promote touching the handle with a user's hands and potentially spreading germs. The latch 500 may also be configured to stay extended when the door is locked to prevent the door from being opened. The door handle and lock may also have a safety override feature which allow the latch to retract and door to be unlocked and/or opened even if the door is locked. The latch 500 be constructed using a durable material which gives it a long-life and withstand wear from its operations and contact with a strike plate. For example, the later may be constructed using bronze, polyoxymethylene, or similar materials.

Figure 6:
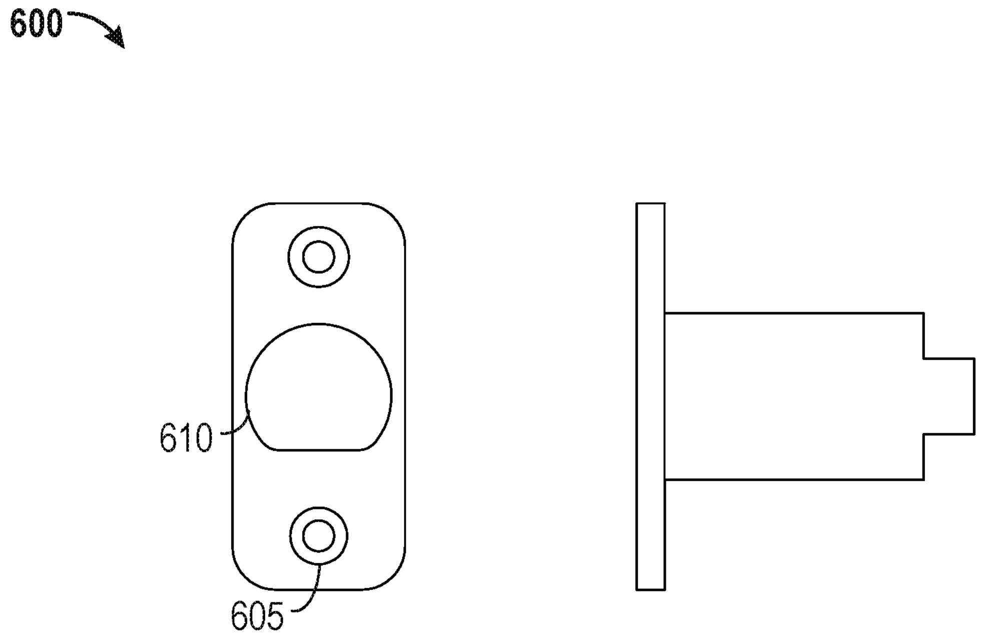
FIG. 6 illustrates an exemplary latch restraint according to one aspect of the present application.

FIG. 6 illustrates an exemplary latch restraint 600 according to one aspect of the present application. The latch restraint 600 may include one or more screw holes 605 which allow the latch restraint 600 to be attached to the side of a door. The latch restraint 600 may include a hole through which the latch protrudes, allowing the latch to engage with a strike plate or other mechanism mounted on the door frame. The exemplary latch restraint 600 may be constructed from durable materials such as metal or hard plastic with an eye towards cost and longevity. The latch restraint 600 may be configured to completely encircle the latch itself, eliminating the potential for any foreign material inside the door from interfering with the latch spring.

Figure 7:
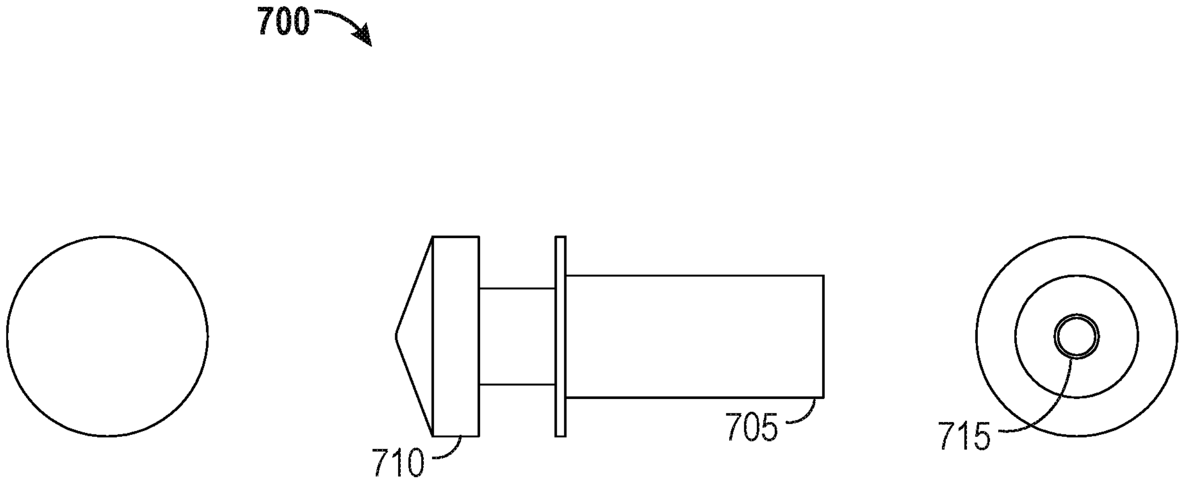
FIG. 7 illustrates an exemplary barrel according to one aspect of the present application.

FIG. 7 illustrates an exemplary barrel 700 according to one aspect of the present application. The barrel 700 may interface with the handle or a piece attached to the handle, such as a rotator. The barrel 700 may extend through or partly through the door and may be configured to move in a direction perpendicular to the plane of the door. For example, the barrel 700 may be configured to extend outward from a back cover of the door handle and lock when the door is locked. When the door is unlocked, the barrel 700 may be configured to be recessed into or partly into the back cover of the door handle and lock. The barrel may be configured to provide an indication on the back cover or the exterior side of the door when the door is locked. For example, the barrel 700 may be colored on its sides 705, such as a red color to indicate stop. This coloration may be hidden or obscured when the door is unlocked, and the barrel is recessed into the back cover. However, when the door is locked, the barrel 700 may be extended and this coloration may be visible to provide an indication that the door is locked. Other indicators that the door is locked may also be used, as may be evident to those skilled in the art.

The barrel 700 may also have an interior shape 710 which allows the door to be locked and unlocked by selectively stopping the latch from depressing when the door lock is in a locked position. The barrel 700 may be configured to interface with the latch to keep the latch extended when the door is locked, while allowing the latch to compress to open and close the door. For example, the latch may have a spring which extends the latch when no force is applied to it. However, the latch may be angled such that it can be opened and closed without turning a handle. The barrel 700 may be shaped to interface with an interior portion of the latch, such that the interior portion of the latch abuts the barrel when the lock is in a locked position. This may prevent the latch from compressing its spring and allowing the door to open. Conversely, when the door is unlocked, the interior portion of the latch may have room to compress its spring and allow the door to open, rather than firmly abutting an interior portion of the barrel.

The barrel 700 may include a central hole 715 which is configured to receive an emergency screw or other implement. This emergency screw may be used to unlock the door in an emergency. This central hole 715 may be threaded, such as threaded after a depth of perhaps one-half an inch. It may be desirable to recess this threading to improve an optical appearance of the door and to potentially make it less obvious how to open the door in an emergency. The emergency screw may also be threaded such that it may be threaded into the barrel. The emergency screw may be used to pull the barrel 700 to unlock the door or to disable the lock on the door. In one aspect, a threaded emergency screw may be threaded into the threaded barrel, and the emergency screw may be pulled to pull out the barrel and unlock the door. In a scenario where the door is being held in a locked position from the inside, the threaded emergency screw may be configured to pull out the barrel 700, removing the force that keeps the latch extended, and allowing the door to be opened despite the door being held locked. For example, this may be useful in a scenario where a child barricades themselves in the washroom. The barrel 700 may be made of a durable material such as hard plastics or metal such as aluminum.

Figure 8:
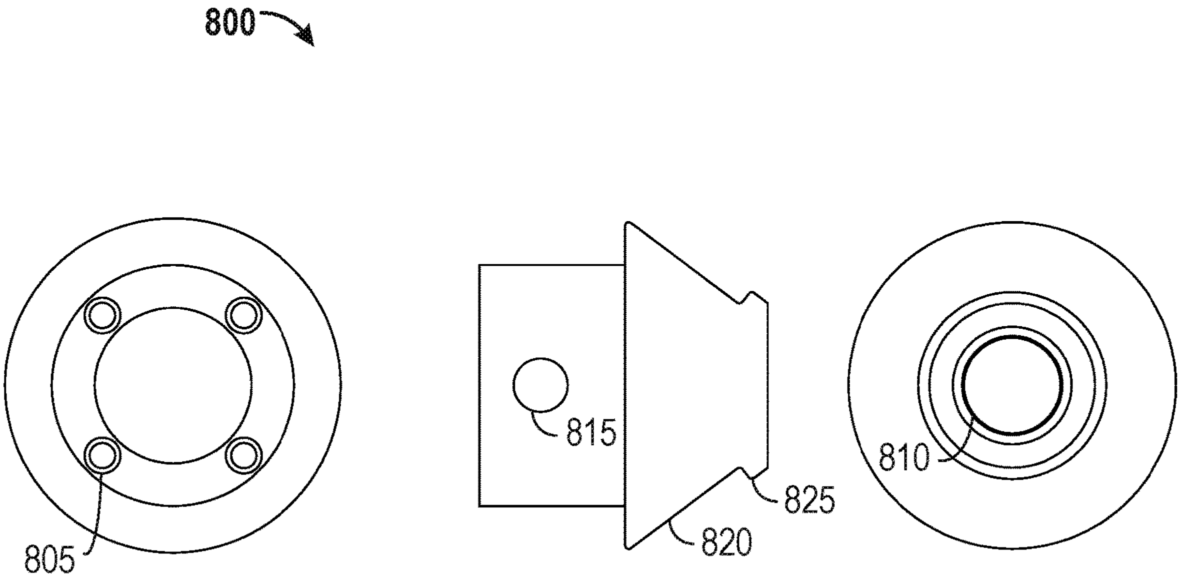
FIG. 8 illustrates an exemplary back cover according to one aspect of the present application.

FIG. 8 illustrates an exemplary back cover 800 according to one aspect of the present application. The back cover 800 may be constructed from a sturdy material such as metal and may provide a significant portion of the structure of the door lock. For example, the back cover may be constructed using aluminum or a similar material. As illustrated, the back cover may contain one or more screw holes 805 or other attachment mechanisms which allow it to be attached to the pull plate, forming a main structure of the interior of the door lock. The back cover 800 may contain a central hole 810 shaped to allow the barrel to be placed inside and to extend out from the back cover. The back cover 800 may also contain a hole 815 on its body which allows the latch to extend out from the back cover and to interface with a strike plate or other exterior surface. The back cover 800 may also have an exterior shape 820 which extends out from a push plate. The back cover 800 may be shaped to resemble a lock, such as the exterior of a dead bolt lock, to inform new users about the function of the back cover. The back cover 800 may also include a lip 825 which can be used to pull the door shut from the outside, if a user decided to close the door and if the door itself does not have a weighted hinge mechanism that closes itself. The back cover 800 may also take other shapes, especially in its exterior-facing portions.

Figure 9:
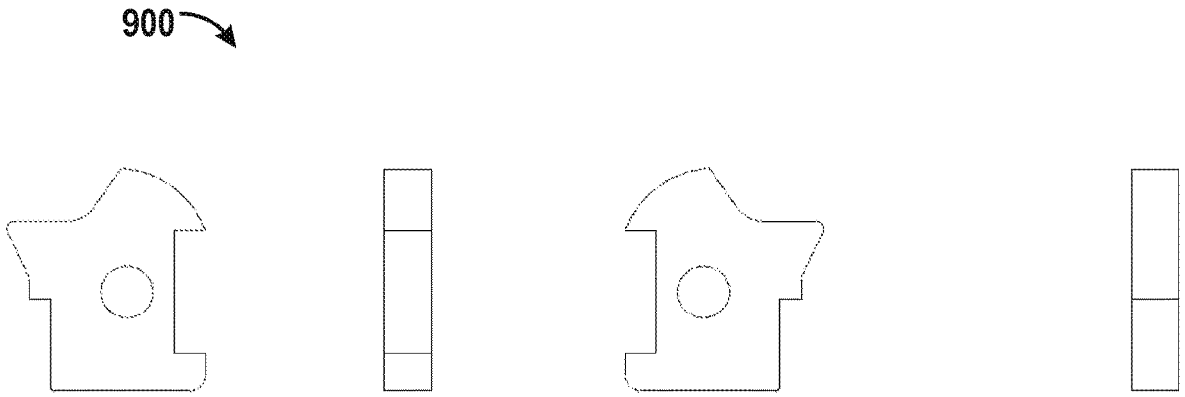
FIG. 9 illustrates an exemplary rotator according to one aspect of the present application.

FIG. 9 illustrates an exemplary rotator 900 according to one aspect of the present application. The rotator 900 may be used to provide an interface for a connection between the handle and the barrel. For example, the rotator 900 may be firmly affixed to the handle or could be added as a part of the handle itself. The rotator 900 may be shaped to allow a motion of the handle to transfer energy from the handle through to the barrel in order to lock and unlock the door. The shape of the rotator 900 may be designed to allow for a tactile feeling when the door is locked and unlocked. The shape of the rotator 900 may also limit the movement of the handle itself. In one aspect, the handle may be largely horizontal and may be moved upwards about its hinges to lock the door. The rotator 900 may be shaped to transfer force to the barrel when the handle is moved upwards. The rotator 900 may also be shaped to stop the handle after a certain amount of upward movement, stopping the handle from moving further upwards after the door is locked. Similarly, the rotator 900 may be configured to unlock the door when the handle is returned to its substantially horizontal position and may be shaped to stop the handle from being moved further downwards once the door is unlocked. In some aspects, the door may be unlocked by moving the handle downwards, whereby the rotator stops applying force to the barrel, which itself may return to the unlocked position based on pressure from a spring or another mechanism. The rotator 900 may be constructed from a durable material such as metal or hard plastic, designed to withstand the forces that will be put on it. For example, the rotator 900 may be constructed using ultra high molecular weight (UHMW) polyethylene or a similar material.

Figure 10:
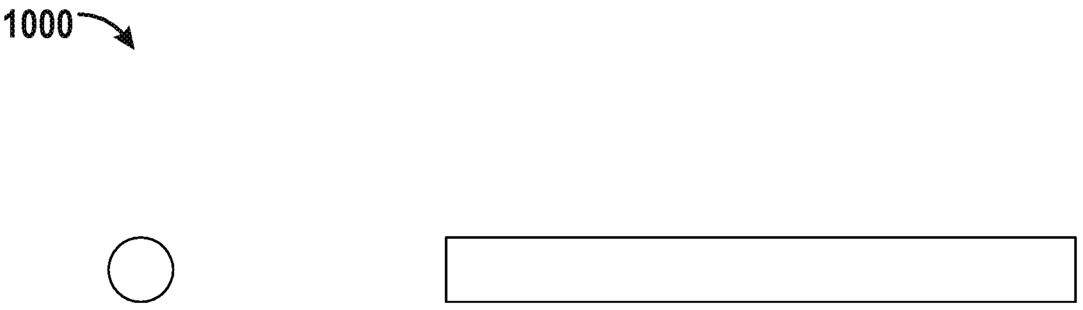
FIG. 10 illustrates an exemplary pin according to one aspect of the present application.

FIG. 10 illustrates an exemplary pin 1000 according to one aspect of the present application. As shown, the pin 1000 may be a cylinder which can be used to attach a door handle to a pull plate. The pin 1000 may allow the door handle to rotate on a hinging mechanism, such as allowing the handle to rotate upwards and/or downwards. The pin 1000 may be durable material such as metal or hard plastic, designed to withstand the forces that will be put on it. For example, the pin 1000 may be constructed using polyoxymethylene or a similar material.

Figure 11:
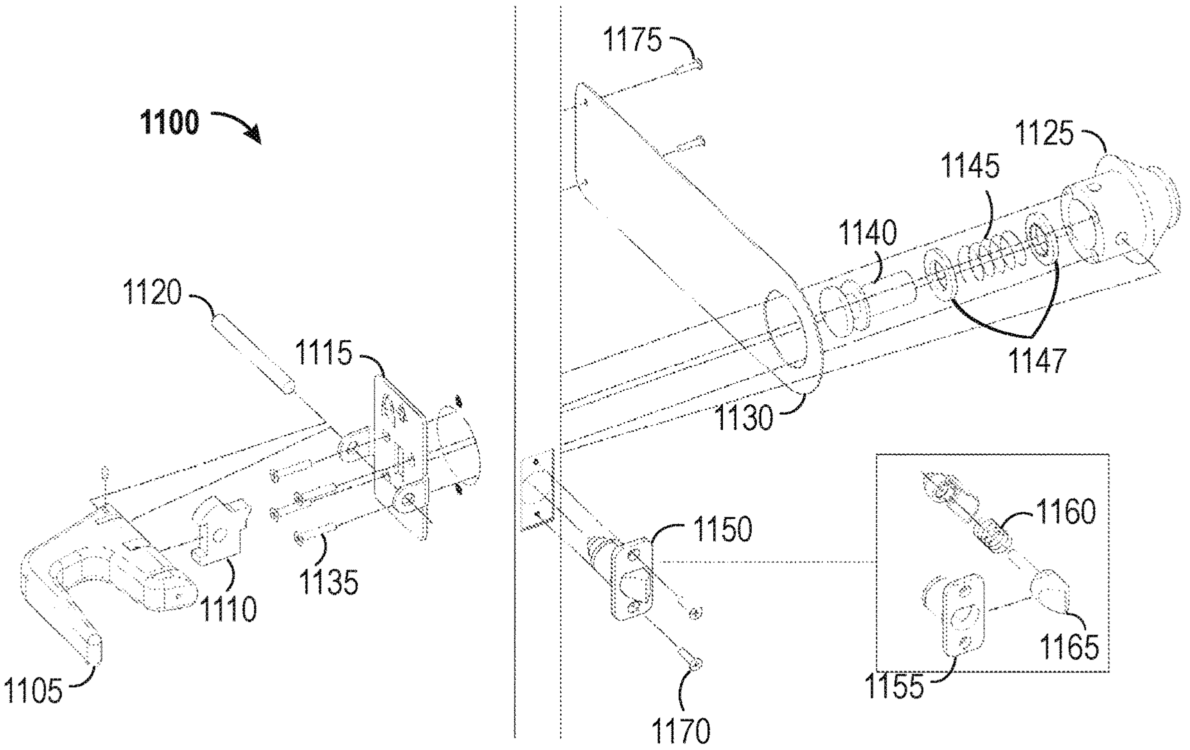
FIG. 11 illustrates an exemplary door handle and locking mechanism according to one aspect of the present application.

FIG. 11 illustrates an exemplary door handle and locking mechanism 1100 according to one aspect of the present application. As illustrated, a handle 1105 and a rotator 1110 may be attached to a pull plate 1115 using a pin 1120 on the interior side of a door such as a single-user washroom stall door. On the other side of the door, a back cover 1125 may be attached to a push plate 1130. The back cover may 1125 be attached to the door and the pull plate 1115 using screws 1135 or another mechanism. A barrel 1140 may be placed inside the door and inside the back cover 1125 and may have a spring 1145 keeping it depressed. The spring 1145 may have a washer 1147 on each side of it to ease wear that could otherwise be caused by friction between the spring 1145 and either the barrel 1140 or the interior of the back cover 1125. The washers 1147 may be made using ultra-high molecular weight polyethylene (UHMW) or another appropriate material for this purpose, which may allow for near zero abrasion on both the spring 1145 and the barrel 1140, enabling quieter operating and lower friction when locking the lock. The barrel 1140 may be configured to interface with the rotator 1110 attached to the handle 1105. The position of the barrel 1140 may be determined by a rotational position of the rotator 1110. A shape of the rotator 1110 may be selected which uses the barrel 1140 to fix the latch 1165 in place when the rotator 1110 is rotated into a locked position. In this way, the shape of the rotator 1110 may prevent the latch 1165 mechanism from retracted when the door is locked. For example, the rotator 1110 may position the barrel 1140 into a position where it mechanically blocks the latch 1165 from retracting when the door is locked, while not restricting the movement of the latch 1165 when the door is unlocked. The door handle and locking mechanism 1100 may further include a latch sub-assembly 1150 which can include a latch restraint 1155, a latch spring 1160, and a latch 1165. The latch 1165 may be configured to allow the door to be pushed or pulled open and pushed or pull closed, when the door is unlocked, by the shape of the latch 1165. As illustrated, these various components may be held together and to the door by screws 1135, 1170, 1175 or other methods of attachment as would be known to those of skill in the art.

In one aspect, the present disclosure provides a locking door handle for a single-user washroom. The handle includes a latch configured to interface with a strike plate, the latch shaped with two angled surfaces which allow a door to be opened and closed by pushing on the door and an interior handle extending outward from an interior side of the door, the interior handle configured to lock and unlock the door by fixing the latch in place. The two angled surfaces of the latch may be angled at different angles than one another. The two angled surfaces of the latch may be different sizes than one another such that a line between the two angled surfaces is not through a center of the latch. One of the two angled surfaces of the latch may be convex. The strike plate may include an exterior surface which is made at least partly of ultra-high molecular weight polyethylene (UHMW). The door may be an inward-swinging single-user washroom door and the handle may be on the inside of a washroom stall.

In one aspect, the latch of the door handle may be pushed into an extended position using a spring. The interior handle may be configured to lock and unlock the door based on an axial rotation. The axial rotation may be about an axis that is parallel to ground level and parallel to a plane of the door. The interior handle may be configured to lock the door with an upward rotation and unlock the door with a downward rotation. Generally, when the door is in a locked state, the latch may be prevented from retracting while when the door is in an unlocked state, the latch may be configured to temporarily retract when force is applied to it, such as the force caused by the strike plate when the door is pushed open or pushed closed. The latch may be fixed in place, prevented from retracting, based on a shape of the rotator, which may physically block the latch from retracting when the door handle is in the locked position. The interior handle may include a lever which is spaced apart from the door to allow for hands-free operation. The lever may face towards the strike plate. The interior handle may be configured to make one or more of a tactile click or an auditory click when locking and/or unlocking the door.

The door handle may further include a back cover on an exterior side of the door, the back cover including a status indicator which provides an indication of whether the door is in a locked state or an unlocked state. The status indicator may be a barrel which protrudes from the back cover when the door is in a locked state, but which does not protrude from the back cover when the door is unlocked. The barrel may have a generally cylindrical shape. The back cover may include a truncated cone shape, comparable to the exterior surface of a conventional dead bolt lock. The barrel may further include a safety feature which allows the door to be unlocked. For example, the barrel may include a threaded hole which allows for the door to be locked or unlocked from an exterior (ingress) side of the door.

In one aspect, a latch for a locking door handle for a door of a single-user washroom is disclosed. The latch includes a first angled surface which allows the door of the single-user washroom to be pushed open, a second angled surface which allows the door of the single-user washroom to be pushed closed, and a locking mechanism which can lock the door by preventing the latch from retracting so the door will remain closed. The first angled surface and the second angled surface may be angled at different angles than each other. The first angled surface and the second angled surface may be different sizes, such that a line between the first angled surface and the second angled surface does not pass through a center of the latch. The second angled surface may be smaller than the first angled surface. The second angled surface may be generally concave while the first angled surface may be not concave.

Implementations disclosed herein provide systems and apparatus for a hands-free locking door device for single-user public washrooms. The phrase "based on" does not mean "based only on," unless expressly specified otherwise. In other words, the phrase "based on" describes both "based only on" and "based at least on." In the foregoing description, specific details are given to provide a thorough understanding of the examples. However, it will be understood by one of ordinary skill in the art that the examples may be practiced without these specific details. For example, the shape and size of various components may be changed for a given implementation or to match design preferences. Certain components may be combined with one another or may be excluded from some implementations. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A locking door handle for a hands-free operation of a door, the door having a major surface defining a plane, the handle comprising:

a latch configured to interface with a strike plate, the latch shaped with at least two angled surfaces adapted to permit the door to be opened and closed responsive to a force applied on the door, the two angled surfaces of the latch are adapted to engage the strike plate angled at different angles than one another such that the latch is not symmetrical; and an interior handle adapted to extend outward from an interior side of the door, the interior handle adapted to either selectively fix the latch in place in a stable blocking configuration or to not fix the latch in place in a stable non-blocking configuration in response to a position of the interior handle to permit the door to respectively be locked and unlocked, wherein the interior handle is adapted for an axial rotation about an axis parallel to the plane of the door.

2. The door handle of claim 1, wherein the two angled surfaces of the latch are different sizes than one another such that a dividing line between the two angled surfaces, the dividing line being parallel to a direction of motion of the latch, is offset from a center of the latch.

3. The door handle of claim 1, wherein one of the two angled surfaces of the latch is convex.

4. The door handle of claim 1, wherein the latch is pushed into an extended position using a spring.

5. The door handle of claim 1, wherein the axial rotation is about an axis that is parallel to ground level.

6. The door handle of claim 1, wherein the interior handle is adapted to selectively fix the latch in place in a stable blocking configuration with an upward rotation and the interior handle is adapted to selectively not fix the latch in place in a stable non-blocking configuration with a downward rotation.

7. The door handle of claim 1, wherein the interior handle includes a lever which is spaced apart from the door to allow for hands-free operation.

8. The door handle of claim 7, wherein the lever faces towards the strike plate.

9. The door handle of claim 1, wherein the interior handle is configured to make one or more of a tactile click or an auditory click when locking or unlocking the door.

10. The door handle of claim 1, further comprising a back cover on an exterior side of the door, the back cover including a status indicator which provides an indication of whether the door is locked.

11. The door handle of claim 10, wherein the status indicator comprises a barrel which protrudes from the back cover when the door is locked.

12. The door handle of claim 11, wherein the barrel comprises a cylindrical shape and the back cover comprises a truncated cone shape.

13. The door handle of claim 11, wherein the barrel further includes a safety feature which allows the door to be unlocked from the exterior side of the door.

14. The door handle of claim 13, wherein the safety feature comprises a hole on the barrel, the hole configured to engage a complementary implement to allow the door to be unlocked from the exterior side of the door.

15. The door handle of claim 1, wherein when the door is locked, the latch is prevented from retracting.

16. The door handle of claim 1, wherein the two angled surfaces of the latch are angled relative to a direction of motion of the latch.

17. The door handle of claim 1, wherein the force applied on the door to be opened is a force applied on an exterior side of the door.

18. The door handle of claim 11, wherein the status indicator does not protrude from the back cover when the door is unlocked.

19. A latch for a locking door handle for a door, the latch comprising:

a latch member movable in a linear direction, the latch member having a first angled surface and a second angled surface, wherein:

the first angled surface is adapted to engage a strike plate to retract the latch member along a linear direction of motion, ; and the second angled surface is adapted to engage the strike plate to retract the latch member along the linear direction of motion; and a locking mechanism, which includes a locking member that is reconfigurable between a stable unlocked configuration which allows the latch member to be displaced to a stable locked configuration which prevents the latch member from being displaced;

wherein the first angled surface and the second angled surface are adapted to engage the strike plate at different angles relative to the linear direction of motion of the latch member.

20. The latch of claim 19, wherein the second angled surface is smaller than the first angled surface.

21. The latch of claim 19, wherein the first angled surface is generally convex and the second angled surface is not concave or convex.

* * * * *